(No Model.)

J. DANISCHEVSKI.
MEANS FOR INFLATING PNEUMATIC TIRES.

No. 533,278. Patented Jan. 29, 1895.

Witnesses
Chas. E. Smith
Geo. E. Morss

Inventor
Joseph Danischevski,
By Briesen & Knauth
his Attorneys.

THE NORRIS PETERS CO., PHOTO-LITHO., WASHINGTON, D. C.

UNITED STATES PATENT OFFICE.

JOSEPH DANISCHEVSKI, OF PARIS, FRANCE.

MEANS FOR INFLATING PNEUMATIC TIRES.

SPECIFICATION forming part of Letters Patent No. 533,278, dated January 29, 1895.

Application filed October 25, 1894. Serial No. 526,945. (No model.) Patented in France April 19, 1893, No. 229,495.

*To all whom it may concern:*

Be it known that I, JOSEPH DANISCHEVSKI, of the city of Paris, France, have invented Means for Inflating a Pneumatic Tire Automatically and Continuously while the Wheel is Running, (for which I have obtained Letters Patent in France for fifteen years, dated April 19, 1893, No. 229,495,) of which the following is a full, clear, and exact description.

The improvement consists essentially in providing within the air tube of the tire, a series of elastic bellows-chambers adapted to draw air into one of the chambers and to force it into another each time that the first becomes flattened by the pressure on the ground. The elastic chambers may be arranged and connected in various ways, of which I will here describe two examples.

Reference is to be had to the accompanying drawings, forming part of this specification, wherein—

Figure 1:
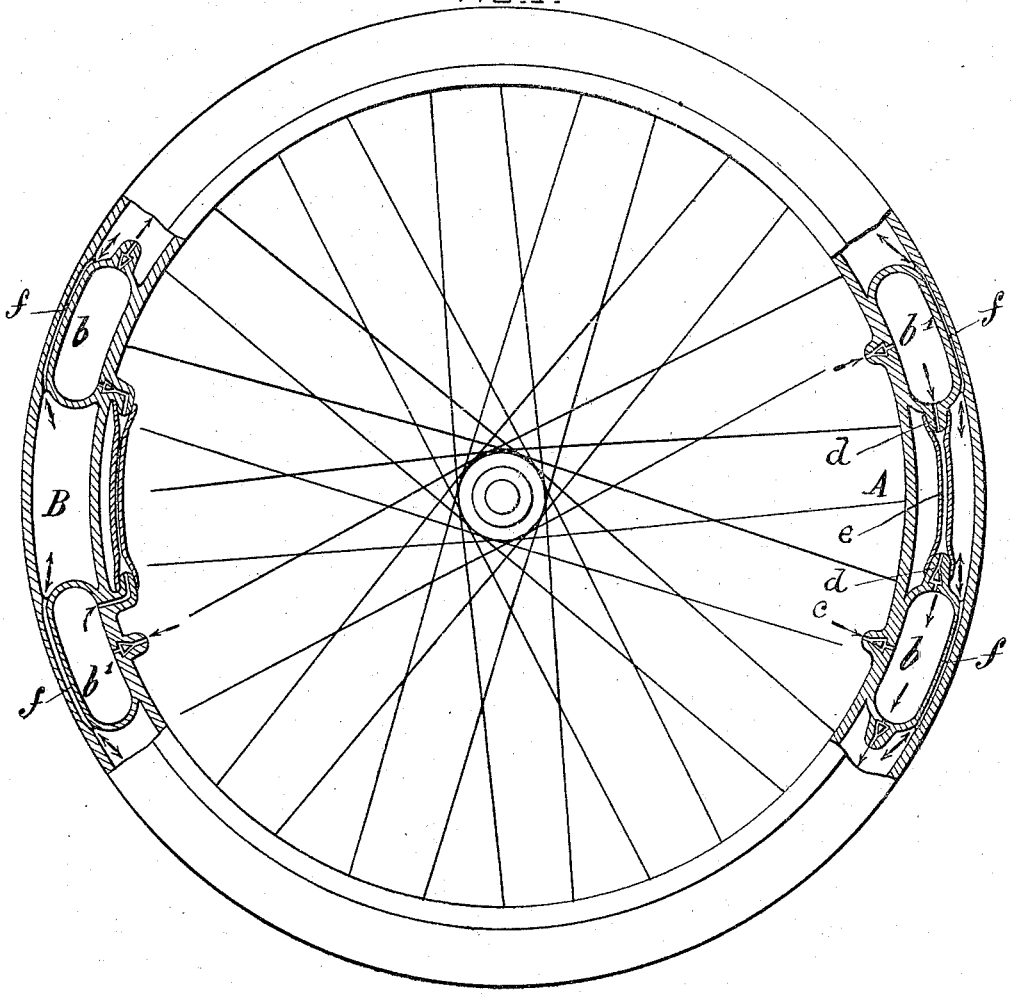
Figure 2:

Figure 1 is an elevation of a velocipede wheel with the tire partly in section in the plane of the wheel, showing at A and B two modes of connecting the elastic chambers. Fig. 2 is a cross-section.

$a$ is the air tube and $b\ b'$ are flexible chambers of suitable dimensions contained within and attached to the wall of the air tube, the said chambers being connected in series and each provided with an air inlet valve $c$ and a delivery orifice $d$ connected by a tube $e$ with the next chamber. It is preferred that the connecting tubes $e$ should be contained within the air chamber as at A, so as to be protected from injury, but they may be outside thereof, as at B. The orifice $d$ by which the compressed air is delivered into the adjoining chamber may be provided with any suitable valve and is preferably made in the form of an india-rubber nipple, which is slightly slitted, so that by the least flattening of the chamber it will discharge a corresponding portion of compressed air. The drawings show only two such chambers as forming the series but a greater number may be employed.

The spaces within the air tube of the tire and between the several elastic bellows chambers are connected by channels $f$ formed in the wall of each chamber to equalize the air pressure upon the end walls of the elastic chambers. At each revolution of the wheel a sufficient quantity of air is compressed to continuously maintain the inflation of the tire, the action being such that the more air will be compressed, and consequently the more perfect will be the inflation of the tire, the more the elastic bellows chambers are compressed. This compression depends on the weight of the rider and consequently the same machine will present the same advantages for a light or heavy rider indifferently, the degree of inflation being thus regulated automatically.

The uniform and constant maintenance of the inflation is insured by the fact that the admission of air to the air tube of the tire only takes place after depression or flattening has taken place and the air discharge valve from the elastic chamber in which the air drawn in by the adjoining chamber has been compressed only opens in consequence of the difference of pressure which is established between the air tube and said chamber and closes automatically immediately equilibrium is restored.

I claim—

In a pneumatic tire the means of automatic and continuous inflation, which consists of one or more series of elastic bellows chambers attached to the inner wall of the tube, the intervening spaces being in free communication by a passage in the thickness of the material, each series comprising the combination of two or more connected elastic chambers whereof the one draws in air and by its compression transfers it to the other in which it is stored under pressure until by the flattening of the air tube the valve of the second chamber is caused to open and to close after equilibrium of pressure has been established between the said chamber and air tube.

The foregoing specification of my "means for inflating a pneumatic tire automatically and continuously while the wheel is running" signed by me this 6th day of October, 1894.

JOSEPH DANISCHEVSKI.

Witnesses:
CLYDE SHROPSHIRE,
ALBERT MOREAU.